United States Patent
Kulkarni et al.

(10) Patent No.: US 10,203,745 B2
(45) Date of Patent: Feb. 12, 2019

(54) APPARATUS AND METHOD FOR DYNAMIC POWER REDUCTION IN A UNIFIED SCHEDULER

(71) Applicant: QUALCOMM Incorporated, San Diego, CA (US)

(72) Inventors: Milind Ram Kulkarni, Raleigh, NC (US); Rami Mohammad A. Al Sheikh, Morrisville, NC (US); Raguram Damodaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 15/086,049

(22) Filed: Mar. 30, 2016

(65) Prior Publication Data

US 2017/0285727 A1    Oct. 5, 2017

(51) Int. Cl.
  *G06F 1/32*    (2006.01)
  *G06F 9/38*    (2018.01)

(52) U.S. Cl.
  CPC .......... *G06F 1/3287* (2013.01); *G06F 9/3836* (2013.01); *G06F 9/3869* (2013.01)

(58) Field of Classification Search
  None
  See application file for complete search history.

(56) References Cited

U.S. PATENT DOCUMENTS

| | | | | |
|---|---|---|---|---|
| 5,553,256 A | * | 9/1996 | Fetterman | G06F 9/30167 711/204 |
| 5,724,536 A | * | 3/1998 | Abramson | G06F 9/30043 712/216 |
| 6,073,215 A | * | 6/2000 | Snyder | G06F 12/0859 711/137 |
| 6,512,397 B1 | * | 1/2003 | Jacobson | G06F 13/14 326/119 |
| 7,617,386 B2 | | 11/2009 | May et al. | |
| 7,873,817 B1 | | 1/2011 | Aloni et al. | |

(Continued)

FOREIGN PATENT DOCUMENTS

| CN | 104657114 A | 5/2015 |
|---|---|---|
| EP | 3065050 A2 | 9/2016 |

OTHER PUBLICATIONS

Bai Y., et al., "A Low-Power In-Order/Out-of-Order Issue Queue", ACM Transactions on Architecture and Code Optimization, vol. 1, No. 2, Jun. 1, 2004, pp. 152-179.

(Continued)

*Primary Examiner* — Paul Yen
(74) *Attorney, Agent, or Firm* — Qualcomm Incorporated

(57) ABSTRACT

A scheduler and method for dynamic power reduction, e.g., in a processor core, is proposed. In conventional processor cores for example, the scheduler precharges grant lines of many instructions only to discharge a great majority of the precharged lines in one cycle. To reduce power consumption, selective precharge and/or selective evaluation are proposed. In the selective precharge, the grant lines of instructions that will evaluate to false (e.g., invalid instructions) are not precharged in a cycle. In the selective evaluation, among the precharged instructions, instructions that are not ready are not evaluated in the same cycle. In this way, power consumption is reduced by avoiding unnecessary precharge and discharge.

23 Claims, 7 Drawing Sheets

(56) References Cited

U.S. PATENT DOCUMENTS

| | | | |
|---|---|---|---|
| 8,689,202 | B1 | 4/2014 | Braun et al. |
| 8,799,912 | B2 | 8/2014 | Memik et al. |
| 9,058,180 | B2 | 6/2015 | Golla et al. |
| 2002/0026545 | A1 | 2/2002 | Yoshida et al. |
| 2012/0291037 | A1 | 11/2012 | Venkataramanan et al. |
| 2013/0042089 | A1 | 2/2013 | Vinh et al. |

OTHER PUBLICATIONS

Hempstead M., et al., "An Ultra Low Power System Architecture for Sensor Network Applications", 2013 21st International Conference on Program Comprehension (ICPC); [International Symposium on Computer Architecture (ISCA)], IEEE, US, May 1, 2005 (May 1, 2005), pp. 208-219, XP058168712, ISSN: 1063-6897, DOI: 10.1109/ISCA.2005.12, ISBN: 978-0-/695-3174-8.
International Search Report and Written Opinion—PCT/US2017/020962—ISA/EPO—dated Jun. 19, 2017.

\* cited by examiner

APPARATUS AND METHOD FOR DYNAMIC POWER REDUCTION IN A UNIFIED SCHEDULER

REFERENCE TO APPLICATIONS FOR PATENT

The present application for patent may be related to the following co-pending U.S. patent application "APPARATUS AND METHOD TO MAXIMIZE EXECUTION LANE UTILIZATION THROUGH A CUSTOM HIGH THROUGHPUT SCHEDULER" having Ser. No. 15/086,052, filed concurrently herewith, assigned to the assignee hereof, and expressly incorporated by reference herein.

FIELD OF DISCLOSURE

Various aspects described herein relate to processors, and more particularly, to power reduction in multi-instruction schedulers in processors.

BACKGROUND

A scheduler is an important component of a processor, and can significantly impact the performance and frequency of a processor core. The performance can be in terms of IPC (instructions per cycle) and the frequency can be in terms of a critical path. FIG. 1 illustrates a structure of a conventional scheduler 100. As seen, the scheduler includes an instruction silo 110, a wakeup block 120, and a picker block 130. Both the wakeup block 120 and the picker block 130 are typically implemented as matrices.

The scheduler 100 can be viewed as a part of the processor core where instructions wait to be dispatched into execution lanes. The following operations—allocation, picking, and wakeup—are associated with the scheduler 100. Before an instruction can be executed, it is initially allocated into the instruction silo 110. Multiple instructions can be allocated. That is, the instruction silo 110 can hold some number of instructions, and every issued instruction is allocated a row.

A primary purpose of the wakeup block 120 is to identify instructions that are ready for execution. An instruction can be ready when all operands of that instruction are available. A ready instruction can bid for grants, i.e., bid for execution privileges. Multiple ready instructions can bid simultaneously, e.g., in the same cycle. The picker block 130 picks or selects one or more ready instructions and grants permission(s) to the selected instruction(s) for dispatch to execution units (e.g., adder, multiplier, shifter, etc.) for execution.

Note that in FIG. 1, there is a "scheduler loop" between the wakeup block 120 and the picker block 130. The scheduler loop includes bids in the direction from the wakeup block 120 to the picker block 130 and grants in the direction from the picker block 130 to the wakeup block 120. The scheduler loop is due to dependencies among the instructions. For example, consider two instructions X=A+B and Y=X+C. In this instance, the second instruction Y=X+C is dependent on the first instruction X=A+B since the operand X of the second instruction is provided by the execution of the first instruction.

FIG. 2 illustrates an example of a picker block 130 implemented as a matrix. A job of the picker block 130 is to arbitrate among bidding instructions. One criteria for arbitration can be age of the instruction. For example, older instructions may be prioritized over newer instructions. In this implementation, it is assumed that instructions are divided into groups. This means that priorities should be maintained between the groups. In the picker matrix, each group owns an arbitration column through which it kills grants to instructions newer than that group. The picking operation can be split into two parts—inter-group picking and intra-group picking. In the inter-group picking, the oldest group is picked. In the intra-group picking, the oldest instruction within the group is picked.

In FIG. 2, inter-group arbitration is illustrated. In this figure, it is assumed that instructions I0, I1 and I2 respectively belong to instruction groups (or simply "group") G0, G1 and G2. It is also assumed that G2 is older than G1 which is older than G0. In other words, the age priority among these groups can be expressed as G2>G1>G0. In the picker matrix, every instruction has a row and every group has a column. For each cell of the picker matrix, an age bit of that cell that indicates whether the instruction assigned to this row is newer (value 1) or not newer (value 0) than the group assigned to this column. For convenience, each cell will be addressed as a (row, column) pair. Since G2 is older than both G1 and G0, the age bits of cells (I0, G2) and (I1, G2) are both "1". Also, since G1 is older than G0, the age bit of cell (I0, G1) is "1".

Now assume that in a cycle, both I0 and I2 are bidding (indicated through thick lines). The columns of corresponding groups G0 and G2 are also asserted (also indicated as thickened lines) since I0 and I2 belong to groups G0 and G2. These column lines are also referred to as "conflict" lines. Since I0 belongs to G0 that is newer than G2 (age bit of cell (I0, G2) is 1), G2 kills the grant to I0 (as indicated by "X" at the I0 and G2 intersection). On the other hand, the grant to I2 is not killed.

As mentioned, FIG. 2 is illustrates inter-group arbitration in which the oldest group is selected. But recall that there is also intra-group arbitration for each group of instructions. Once the oldest group is selected, the intra-group picker selects the oldest instruction within the oldest group.

FIG. 3 illustrates a circuit detailing a cell of the picker block 130 of FIG. 2. In FIG. 3, it is assumed that a signal is set/reset (asserted/not asserted) when the voltage of the signal line is high/low. During a cycle, the grant lines of instructions are subjected to two phases—precharge and evaluation. During the precharge phase, the grant line for each instruction is precharged to high. During the evaluation phase, each instruction is evaluated. If the evaluation determines that the instruction should not be granted, the grant line is discharged. In other words, if the instruction grant evaluates to false, the grant line is pulled down. FIG. 3 shows multiple paths through which a grant line is evaluated. As seen, there are three pull-down conditions for grant of an instruction:

the instruction is not ready (~ready_clk signal);
  the instruction does not belong to the oldest group (conflict_in signal); and
  the instruction is not the oldest instruction within the group (kill_in signal).

In the wakeup block 120, a granted instruction can wake up its dependents, and the dependent instruction can bid in the next cycle. FIG. 4 illustrates an example of this dependency wakeup approach in which the wakeup block 120 is implemented as a matrix with instructions I0, I1 and I2 with the critical path shaded (explained further below). This wakeup matrix includes one row and one column for each instruction. For each cell, a dependency bit of that cell that indicates whether the instruction assigned to this row is dependent on the instruction assigned to this column. For convenience, each cell will be addressed as a (row, column)

pair. In this instance, it is assumed that I1 is dependent on I2 illustrated with the dependency bit of cell (I1, I2) being set.

In FIG. 4, it is also assumed that the grant line for I0 is asserted, i.e., the picker (not shown) has granted I0 for dispatch as indicated by the shading of the "I0 grant" row. Each granted instruction announces or broadcasts that it has been granted as indicated by shading of the "I0 broadcast" column. For each instruction dependent on the granted instruction, the dependency is cleared, which is indicated by the transition of the bit cell value from "1" to "0". Effectively, the broadcast resets all dependency bits along that column. In this figure, the dependency bits of cells (I1, I0) and (I2, I0) are cleared. When all dependency bits are cleared for an instruction, that instruction is ready and bids for execution in the next cycle. For example, note that I2 has no more remaining dependencies after the grant to I0. This means that I2 can bid in the next cycle as indicated by the shading of the "I2 ready" row via the dependency bit of cell (I2, I0). On the other hand, I1 is not yet ready since its dependency on I2 remains even after the grant to I0. Therefore, I1 will not bid in the next cycle.

It is desirable to improve the power efficiency of a high-throughput scheduler which employs a dynamic grant scheme. Grant involves a wide dynamic "AND." Referring back to FIG. 3, it is indicated above that there are the precharge and evaluation phases for granting of instructions. During the precharge phase, the grant lines are precharged to high. During the evaluation phase, if there is any conflict and the instruction is not selected, then the grant line is pulled down since the instruction cannot be granted for dispatch. As the number of ready instructions is low compared to the window size, a majority of grant lines are precharged in a cycle only to be discharged in the same cycle, and this occurs cycle after cycle after cycle. In short, many grant lines are needlessly powered.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

One or more aspects are directed to a scheduler. The scheduler may comprise a picker block and a validity block. The picker block may be configured to grant an instruction for execution. The validity block may comprise a validity indicator configured to generate a valid signal. When set, the valid signal may indicate that the instruction is valid. An instruction may be valid when it has been allocated to the scheduler but has not yet been dispatched. The picker block may comprise a precharge switch configured to selectively precharge a grant of the instruction. Selective precharging may include precharging one or more grant lines of the instruction when the valid signal is set, and refraining from precharging any of the one or more grant lines of the instruction when the valid signal is not set.

One or more aspects are directed to a method of scheduling instructions in a scheduler. The method may comprise determining whether or not the instruction in a scheduler is valid. An instruction may be valid when it has been allocated to the scheduler but has not yet been dispatched. The method may also comprise precharging one or more grant lines of the instruction when it is determined that the instruction is valid. The method may further comprise refraining from precharging any of the one or more grant lines of the instruction when the valid signal is not set.

One or more aspects are directed to a scheduler. The scheduler may comprise means for granting an instruction for execution. The scheduler may also comprise means for generating a valid signal. When set, the valid signal may indicate that the instruction is valid. An instruction may be valid when it has been allocated to the scheduler but has not yet been dispatched. The scheduler may further comprise means for selectively precharging a grant of the instruction configured to precharge one or more grant lines of the instruction when the valid signal is set, and configured to refrain from precharging any of the one or more grant lines of the instruction when the valid signal is not set.

BRIEF DESCRIPTION OF THE DRAWINGS

The accompanying drawings are presented to aid in the description of aspects of the disclosure and are provided solely for illustration and not limitations thereof.

DETAILED DESCRIPTION

Figure 1:
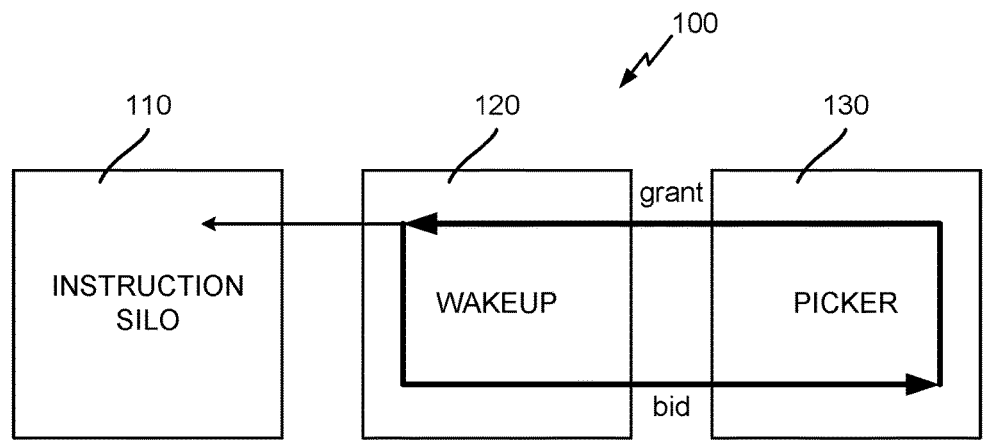
FIG. 1 illustrates a structure of a scheduler.
Figure 2:
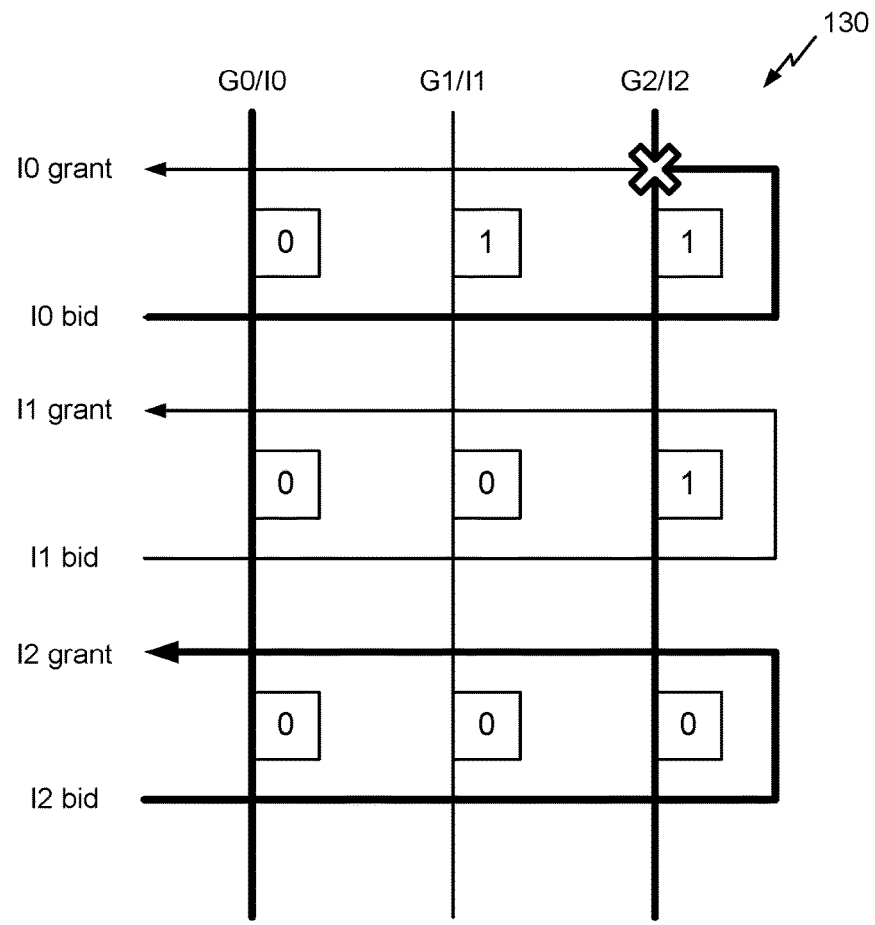
FIG. 2 illustrates a picker of a scheduler implemented as a matrix.

Specific examples of the disclosure are described in the following description and related drawings. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein is for the purpose of describing particular aspects only and is not intended to be limiting of the aspects. As used herein, the singular forms "a," "an," and "the" are intended to include the plural forms as well, unless the context clearly indicates otherwise. It will be further understood that the terms "comprises," "comprising," "includes," or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to," or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, the sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As mentioned, one (of which there can be several) disadvantage of a conventional scheduler is that in a cycle, grant lines of many instructions are precharged in the precharge phase only to be discharged during the evaluation phase of the same cycle because the instructions cannot be dispatched for one reason or another. This charging and precharging can occur in cycle after cycle, and thus can represent significant power waste.

In an aspect of the disclosure, power consumption may be reduced by avoiding unnecessary precharging, also referred to as "selective precharge", of signals such as the grant lines of instructions. For example, if it can be determined beforehand that an instruction will not be granted, i.e., if it can be determined that the grant of that instruction will evaluate to false, then the precharging the grant lines is unnecessary. Therefore, it may be desirable to limit the precharging to the grant lines of those instructions that have some chance of being evaluated to true. That is, selectively precharge the grant lines of instructions that may be granted through the evaluation, and refrain from precharging the grant lines of instruction what will not be granted.

In another aspect of the disclosure, power consumption may be reduced through avoiding unnecessary evaluations. For example, a grant line of an instruction may be precharged in a cycle (e.g., because the instruction is valid). However, the instruction may not be ready (e.g., because not all operands of the instructions are available). Under such a circumstance, the grant of that instruction evaluating to false is essentially a certainty. In this instance, power may be saved by NOT discharging the grant line in that cycle. Instead, evaluation can take place in a later cycle when the instruction becomes ready. In other words, it may be preferable to selectively evaluate grants, e.g., by limiting the evaluation to the ready instructions only and refrain from evaluating the non-ready instructions.

Figure 5:
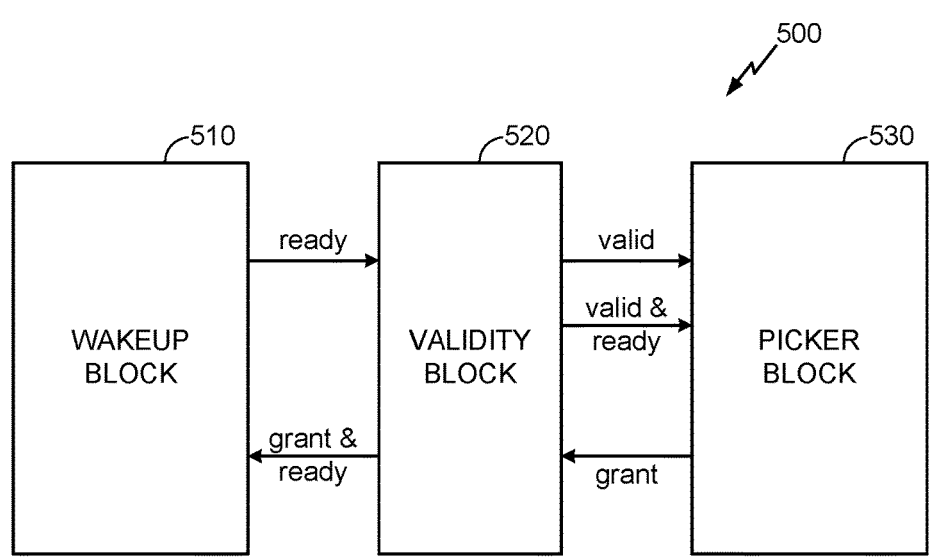
FIG. 5 illustrates block diagram of a scheduler according to a non-limiting aspect of the disclosure.

FIG. 5 shows a block diagram illustrating a scheduler 500 configured to implement the selective precharge and/or the selective evaluation. The scheduler 500 may comprise a wakeup block 510, a picker block 530, and a validity block 520 in between the wakeup block 510 and the picker block 530. While not shown, it can be assumed that plural instructions can be allocated to the scheduler and each instruction corresponds to a row of the scheduler 500. Also, the instructions may be grouped into a plurality of instruction groups (or simply groups). FIG. 5 shows the following signals—ready signals, valid signals, valid & ready signals, grant signals, and grant & ready signals—for communication among the wakeup block 510, a picker block 530, and a validity block 520. The meanings of these signals will become clear from the description below.

In one aspect, the validity block 520 may be configured to determine, for each row of the scheduler 500, whether or not the instruction corresponding to that row is valid. From this perspective, the validity block 520 may be viewed as comprising a column matrix with a number of rows corresponding to the window size in which each row includes a cell that can indicate the validity of that row's instruction.

Figure 6:
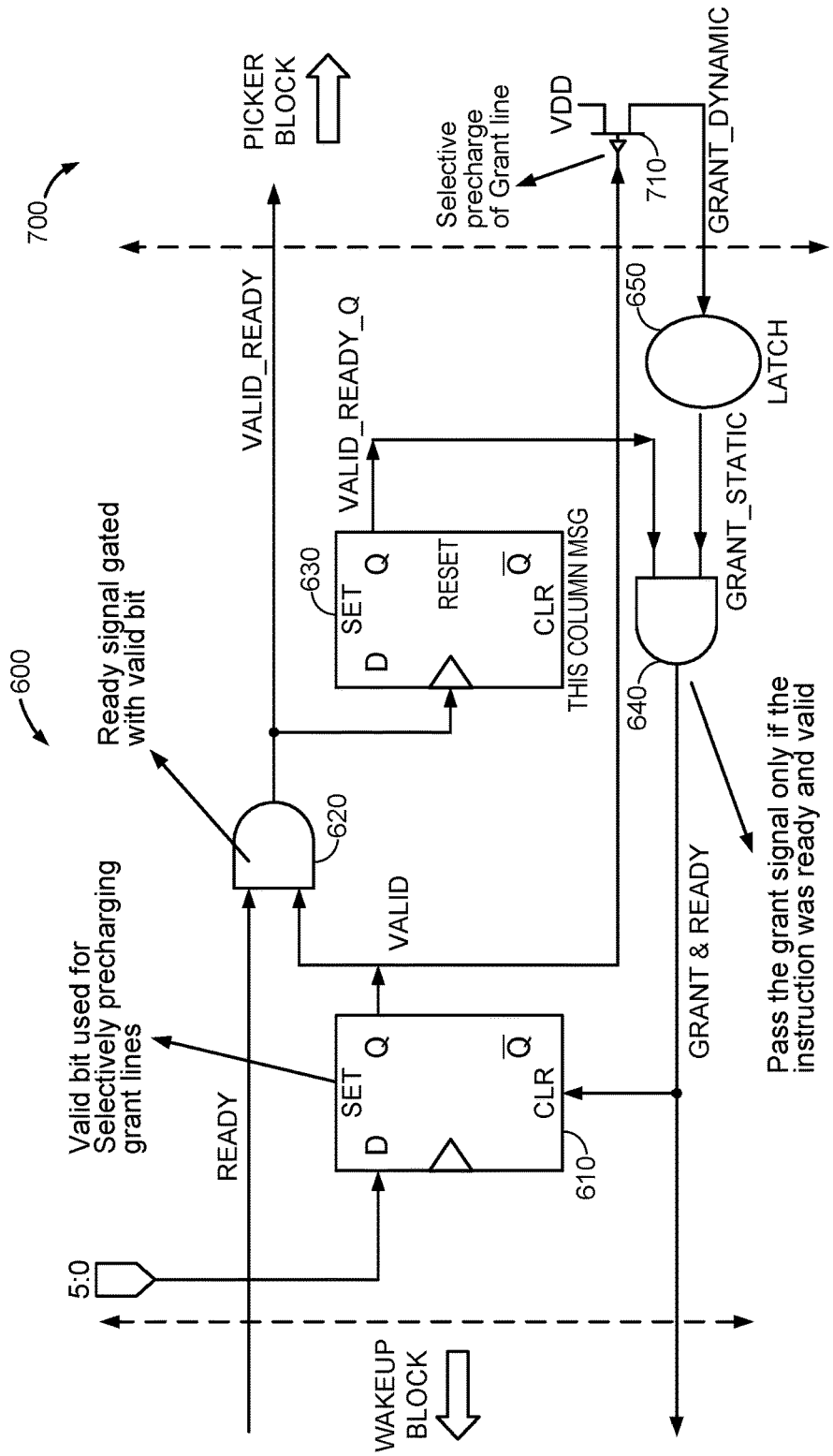
FIG. 6 illustrates a circuit of a cell of a validity block according to a non-limiting aspect of the disclosure.

FIG. 6 illustrates a circuit of an example cell 600 of the validity block 520. In this and other figures of this disclosure, it is assumed that a signal is set/reset (asserted/cleared) when the voltage of the signal line is high/low. However, this should not be taken to be limiting. One skilled in the art would realize that same or similar logic may be implemented in a variety of ways, e.g., currents, magnetic fields, and so on).

The cell 600 may include a validity indicator 610 configured to generate a valid signal to indicate whether the instruction of the row is valid. An instruction may be valid if it has been allocated (e.g., into the instruction silo), but has not yet been granted for execution. This means that when an instruction is issued into the scheduler 500, its validity should be set. Conversely, when the instruction is granted, its validity should be cleared. In one aspect of the disclosure, a single bit may be used to indicate whether or not the instruction is valid. For example, the validity indicator 610 may be implemented as a flip-flop configured to generate the valid signal (e.g., the Q output of the flip-flop 610) as a bit value. The valid signal may be provided to a cell 700 of the picker block 530.

Note that the valid signal allows the picker block 530 to selectively precharge the grant lines. If the valid signal is not set, this informs the picker block 530 that the instruction not valid. Therefore, there is no need to precharge the grant line of the row. On the other hand, if the instruction is valid, then the instruction may be granted for execution if and when it is evaluated. Of course, the grant may evaluate to false. Nonetheless, since there is a chance of the grant evaluating to true, the instruction's grant line(s) should be precharged. FIG. 6 also illustrates a part of the cell 700 of the picker block 530 (further details provided in FIG. 7). The cell 700 may include a precharge switch 710 (e.g., implemented as a transistor) which can be activated by the valid signal from the validity indicator 610 to selectively precharge the grant line.

The cell 600 of the validity block 520 may also include a valid & ready signal generator 620 configured to generate the valid & ready signal. In one aspect of the disclosure, the valid & ready signal generator 620 may be implemented as an AND logic that takes as inputs the ready signal (from the validity block 520) and the valid signal of the validity indicator 610. This means that when it is set, the valid & ready signal indicates that the instruction is both valid and ready. The valid & ready signal maybe provided to the picker block 530.

Figure 7:
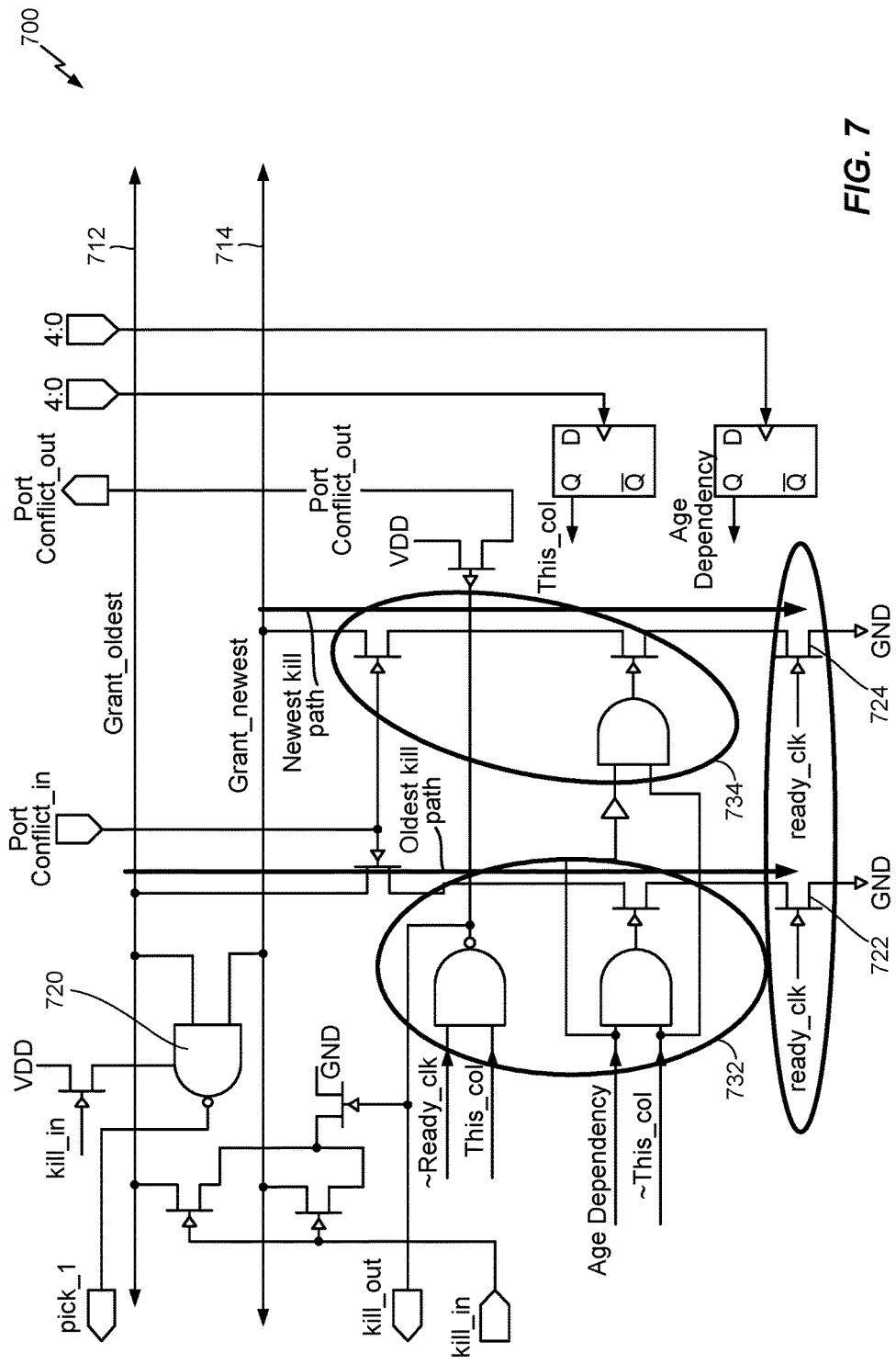
FIG. 7 illustrates a circuit of a cell of a picker block according to a non-limiting aspect of the disclosure.

FIG. 7 illustrates a circuit of an example cell 700 of picker block 530. The cell 700 may be configured to perform inter-group arbitration. The picker block 530 may comprise one or more cells 700. While not shown in FIG. 7, it can be assumed that there is a global grant line shared between all pickers. When there are two or more ready groups, the proposed inter-group picker may pick multiple (e.g., two) groups. For example, the oldest ready group and the newest ready group may be picked.

The phrase "ready group" used above (as in oldest ready group, newest ready group) is explained as follows. Recall that the instructions allocated into the scheduler may be divided into a plurality of groups. For each group, if that group has one or more ready instructions, then that group may be a ready group. Also, the oldest ready group may refer to a group that has the oldest ready instruction. Conversely, the newest ready group may refer to a group that has the newest ready instruction.

The cell 700 of the picker block 530 may comprise one or more grant lines. To state it another way, an instruction may be associated with one or more grant lines. For example, when there are two grant lines per row as illustrated in FIG. 7, then it is possible for the picker block 530 to grant two instructions for execution in one cycle. In FIG. 7, the two grant lines include—a grant new line 714 and a grant old line 712 to enable instructions from the newest and the oldest ready groups to be picked. It should be understood that the grant new and the grant old lines 714, 712 may be provided per picker per row. In this figure, the precharge switch 710 is not shown. Nonetheless, it can be assumed that both the grant new and old lines 714, 712 are selectively precharged through one or more precharge switches 710 (e.g., there may be two precharge switches 710, one for each grant line) when the valid signal indicates that the instruction associated with this cell is a valid instruction.

Figure 3:
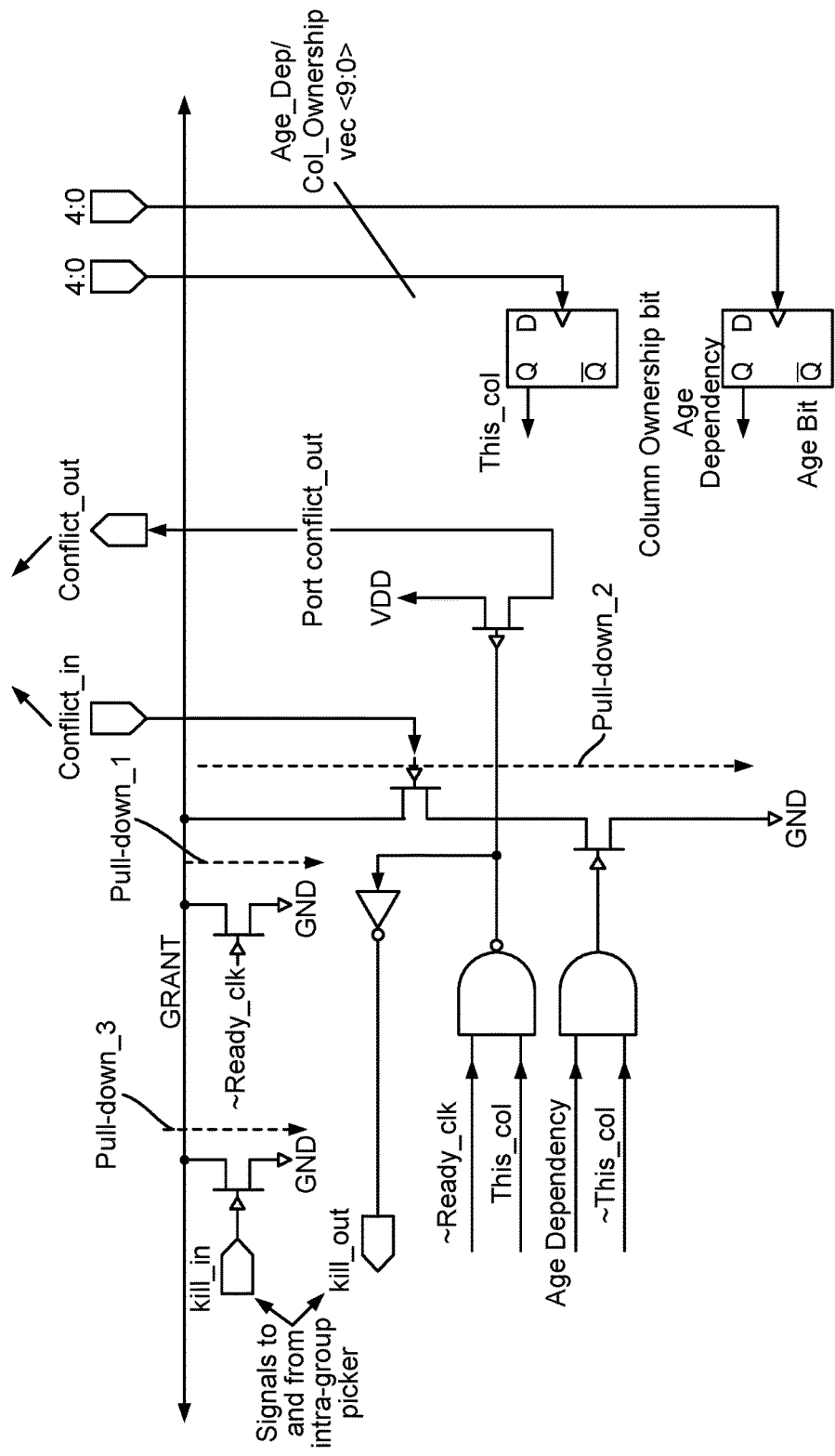
FIG. 3 illustrates a circuit of a cell of a picker of a scheduler.
Figure 4:
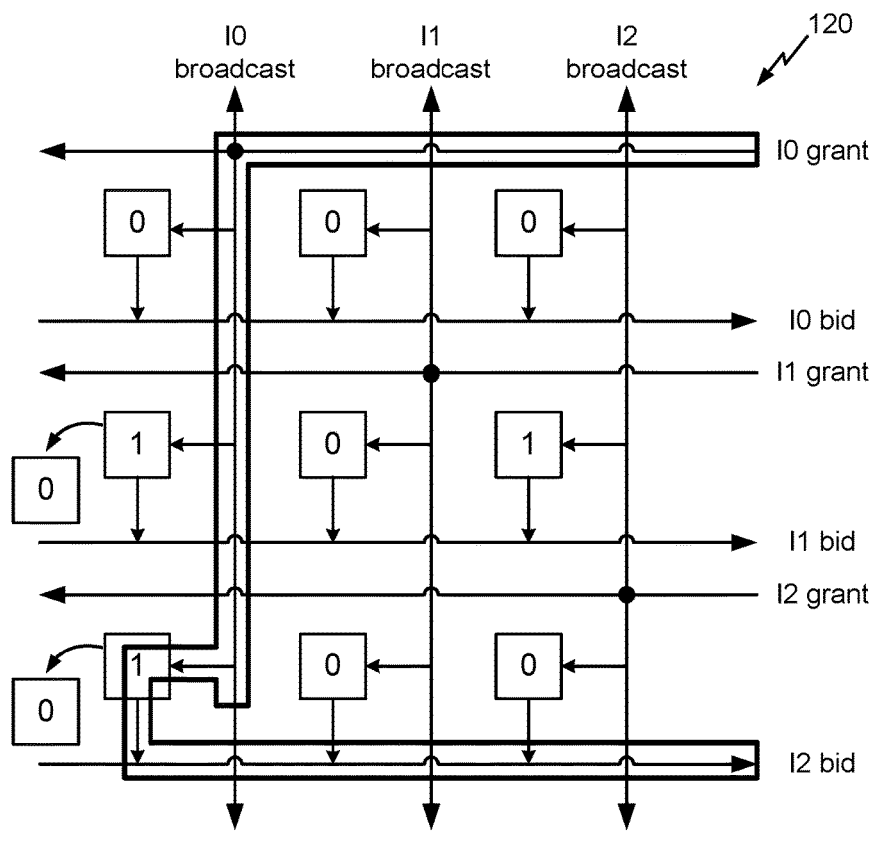
FIG. 4 illustrates a wakeup of a scheduler implemented as a matrix.

Unlike the cell 400 of the conventional picker block (see FIG. 3), the cell 700 does not include transistors that activate to pull down the voltages of either the grant old line 712 or the grant new line 714 when the instruction is not ready. This means that if the instruction is a valid instruction, the grant new and old lines 714, 712 will be precharged in the precharge phase (since the instruction is valid) and will remain charged during, i.e., NOT pulled-down, in the evaluation phase even if the instruction is not ready. In other words, the grant lines will remain set (charged) after the evaluation phase for valid but non-ready instructions. But this does not represent a problem since the non-ready instructions are not evaluated as will be further explained below of discussion related to a valid & ready indicator 630, a grant & ready indicator 640, and an evaluation latch 650 of the validity block 520.

Recall that the cell 600 of the validity block 520 can provide the valid & ready signal. In FIG. 7, the cell 700 of the picker block 530 may include new and old evaluation enable switches 724 and 722 (implemented as transistors in this example) that correspond respectively to the grant new and old lines 714, 712. The new and old evaluation enable switches 724 and 722 may receive the valid & ready signal from the validity block 520. In between the grant new line 714 and the new evaluation enable switch 724, there may be a circuitry 734 (transistors, logic gates, etc.) configured to perform a grant new evaluation to evaluate whether a group of the instruction is the newest ready group. This circuitry, which may be referred to as a grant new evaluation circuit 734, may be in between the grant new line 714 and the new evaluation enable switch 724. Similarly, a grant old evaluation circuit 732 configured to perform a grant old evaluation (whether the group is the oldest ready group) may be in between the grant old line 712 and the old evaluation enable switch 722.

If the instruction is neither valid nor ready, then the new and old evaluation switches 724, 722 may be deactivated which turns off the electrical paths between the grant new and old lines 714, 712 and ground. When the new and old evaluation switches 724, 722 are deactivated, the grant new and old evaluation circuits 734, 732 have no influence. Effectively, this means that the evaluation can be prevented for non-ready instructions (the grant new and old lines 714, 712 remain charged), and thus can save power. If the instruction is both valid and ready (the valid & ready signal is set), then the new and old evaluation switches 724, 722 may be activated, and the grant new and old lines 714, 712 can be evaluated. In other words, the new and old evaluation switches 724, 722 may respectively allow selective evaluation of the grant new and old lines 714, 712 based on the valid & ready signal.

If the evaluation is enabled (e.g., the valid & ready signals) and the grant old line 712 is set (remains high) after evaluation, this indicates that the group associated with the cell is the oldest ready group. Similarly, if the grant new line 714 is set (remains high) after evaluation, this indicates that the group associated with the cell is the newest ready group.

Referring back to FIG. 6, the cell 600 of the validity block 520 may also include the valid & ready indicator 630, the grant & ready indicator 640, and the evaluation latch 650. The valid & ready indicator 630 (which may be implemented as a flip-flop) may be configured to gate the valid & ready signal from the valid & ready signal generator 620. The evaluation latch 650 may be configured to latch a grant evaluation result when the evaluation is performed by the cell 700 of the picker block 530. That is, the evaluation latch 650 may latch signal(s) from one or both of the grant new and old lines 714, 712. The grant & ready indicator 640 (which may be implemented as an AND gate) may be configured to generate a grant & ready signal, based on signals from the valid & ready indicator 630 and the evaluation latch 650.

It was indicated above that the grant lines being precharged and remaining precharged for a valid but non-ready instruction does not represent a problem. When the instruction is evaluated and the grant new and old line 714, 712 remain high, the instruction can be granted for execution. However, recall that the same grant lines can remain high because the instruction is valid (therefore precharged) but not evaluated (therefore NOT pulled down). The cell 600 of the validity block 520 may be configured to distinguish between situations. Recall that in an aspect, only the valid and ready instructions may be evaluated. In FIG. 6, the valid & ready signal from the valid & ready indicator 630 (e.g., the output of the flip-flop 630) will not be set—i.e., will be cleared—if the instruction is not valid or is not ready. This means that the grant & ready signal output by the grant & ready indicator 640 will also be cleared as long as the instruction is not ready or is not valid. If the instruction is ready and valid, the picker block 530 can perform the evaluation, the evaluation latch 650 can latch the evaluation result, and the grant & ready indicator 640 can reflect the latched evaluation result. Thus, it can be said that when the grant & ready signal is set, it indicates that the instruction has been granted. Note that the validity indicator 610 may be configured to clear the validity of the instruction when the grant & ready signal is set. This is proper since an instruction does become invalid upon grant.

The grant & ready signal may be provided to the wakeup block 510. While not shown, the wakeup block 510 may be configured to wake up other instructions that are dependent on the instruction when the grant & ready signal is set. Again, this is proper since a granted instruction should wakeup its dependents. Note that the structure of the cell 600 prevents non-ready instructions from waking up its dependents.

Figure 8:
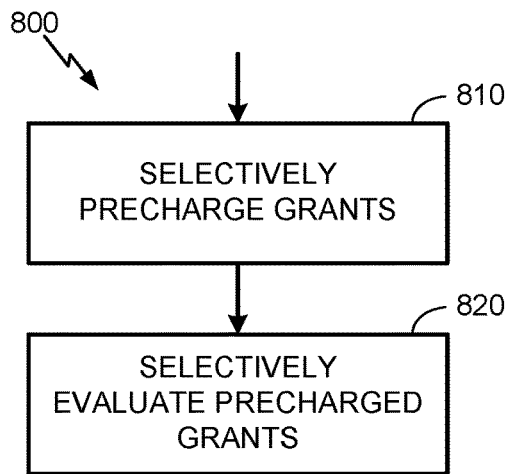
FIG. 8 illustrates a flow chart of a method performed by a scheduler for scheduling instructions according to a non-limiting aspect of the disclosure.

FIG. 8 illustrates a flow chart of a method 800 performed by the scheduler 500 to save power according to a non-limiting aspect of the disclosure. In 810, the scheduler 500 may selectively precharge grants of instructions. In an embodiment, the scheduler 500 may precharge grant lines (e.g., grant new and/or grant old lines 714, 712) of all valid instructions. In 820, the scheduler 500 may selectively evaluate the precharged grants. In an embodiment, the scheduler 500 may evaluate the ready instructions among the instructions whose grant lines have been precharged.

Figure 9:
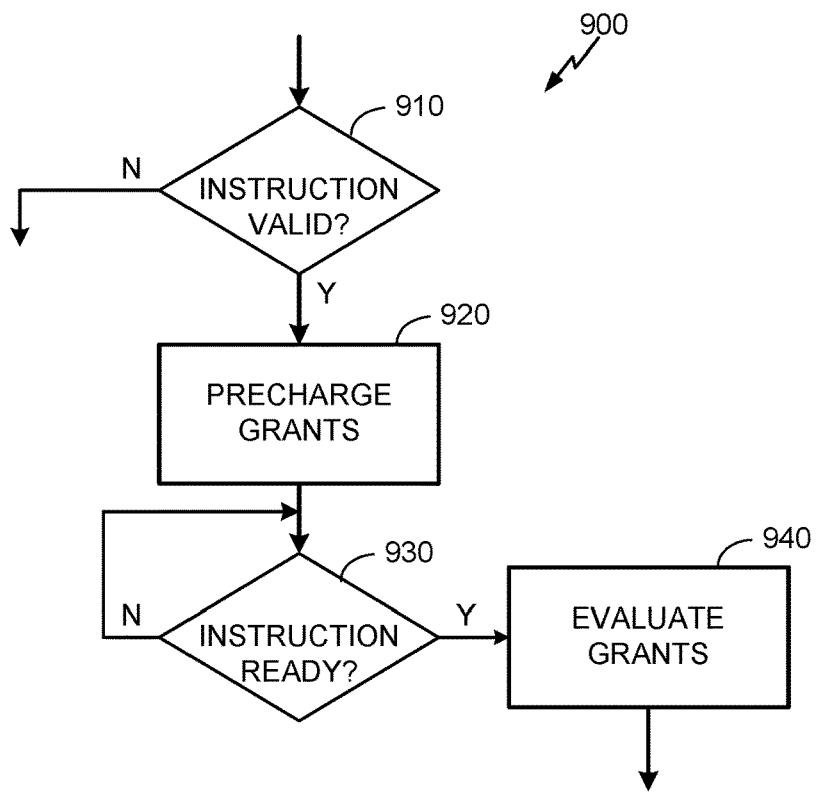
FIG. 9 illustrates a flow chart of another method performed by a scheduler for scheduling instructions according to a non-limiting aspect of the disclosure

FIG. 9 illustrates a flow chart of a method 900 performed by the scheduler 500 to save power according to a non-limiting aspect of the disclosure. In particular, the method 900 may be performed for each instruction in the scheduler 500. In 910, the scheduler 500 may determine whether or not the instruction is valid. If the instruction is not valid, then no further action may be taken for that instruction. For example, the grants of the instruction need not be precharged. If the instruction is valid, then in 920, the scheduler 500 may precharge the grants of the instruction. In 930, scheduler 500 may determine whether or not the instruction is ready. If the instruction is ready, then in 940, the scheduler 500 may evaluate to determine whether or not the instruction should be granted.

Through selective precharge and/or selective evaluation as discussed above, power consumption may be reduced. The scheduler 500 may be a scheduler of a processor core. In one aspect of the disclosure, the scheduler 500 may be implemented entirely in hardware. But in another aspect, the scheduler 500 may be reconfigurable (e.g., through firmware updates).

Figure 10:
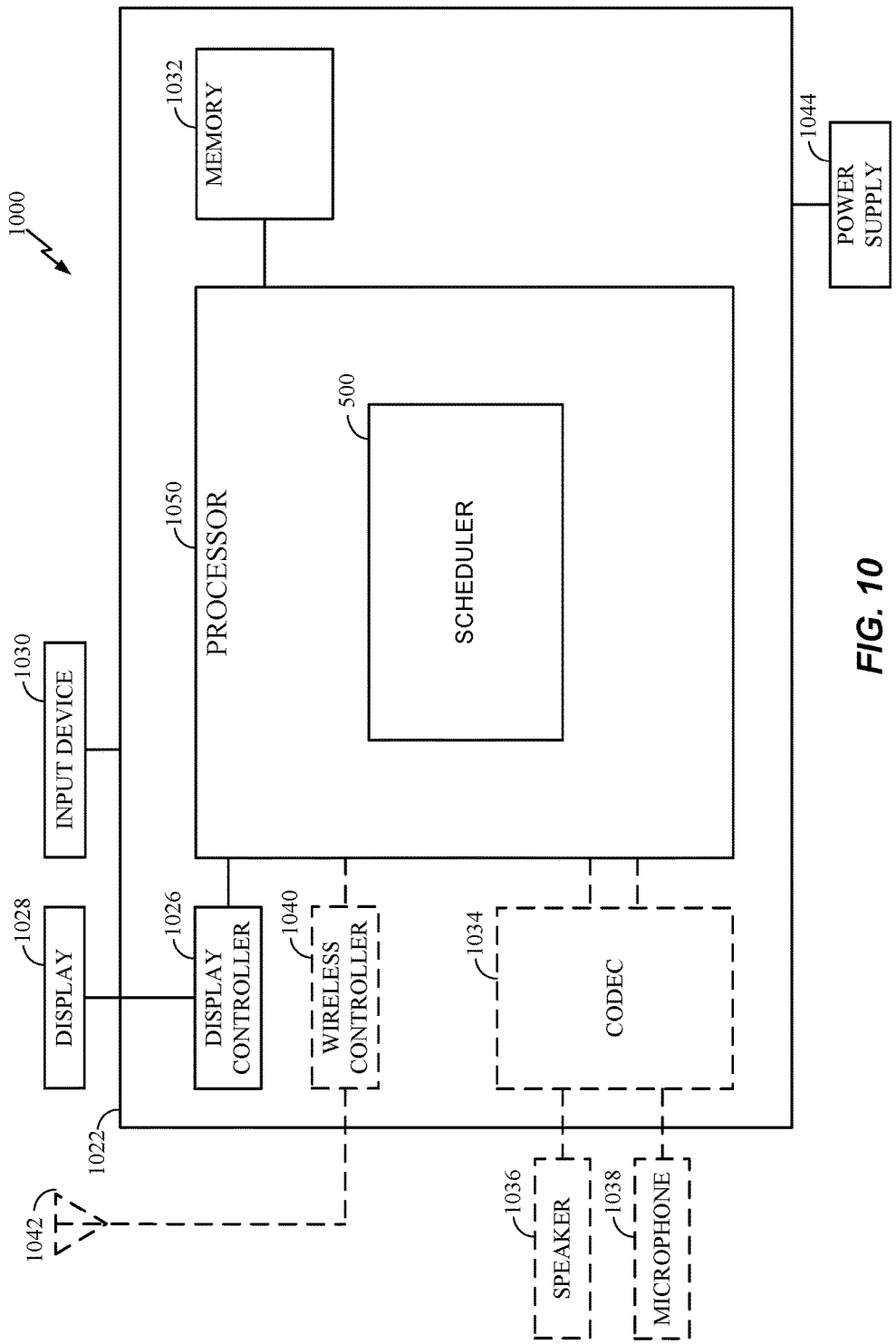
FIG. 10 illustrates an exemplary computing device, in which an aspect of the disclosure may be advantageously employed.

Referring now to FIG. 10, a block diagram of a computing device that is configured according to exemplary aspects is depicted and generally designated 1000. In some aspects, computing device 1000 may be configured as a wireless communication device. As shown, computing device 1000 includes processor 1050, which may be configured to implement method 800 of FIG. 8 and/or method 900 of FIG. 9 in some aspects. Processor 1050 may comprise a scheduler such as the scheduler 500 discussed above. Processor 1050 may be communicatively coupled to memory 1032. Computing device 1000 also include display 1028 and display controller 1026, with the display controller 1026 coupled to processor 1050 and to display 1028.

In some aspects, FIG. 10 may include some optional blocks showed with dashed lines. For example, the computing device 1000 may optionally include coder/decoder (CODEC) 1034 (e.g., an audio and/or voice CODEC) coupled to processor 1050; speaker 336 and microphone 1038 coupled to CODEC 334; and wireless controller 1040 (which may include a modem) coupled to wireless antenna 1042 and to processor 1050.

In a particular aspect, where one or more of the above-mentioned optional blocks are present, processor 1050, display controller 1026, memory 1032, CODEC 1034, and wireless controller 1040 can be included in a system-in-package or system-on-chip device 1022. Input device 1030, power supply 1044, display 1028, input device 1030, speaker 1036, microphone 1038, wireless antenna 1042, and power supply 1044 may be external to system-on-chip device 1022 and may be coupled to a component of system-on-chip device 1022, such as an interface or a controller.

It should be noted that although FIG. 10 depicts a computing device, processor 1050 and memory 1032 may also be integrated into a server, a set top box, a music player, a video player, an entertainment unit, a navigation device, a personal digital assistant (PDA), a fixed location data unit, a computer, a laptop, a tablet, a communications device, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and methods have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment can include a computer readable media embodying a method of forming a semiconductor device. Accordingly, the scope of the disclosed subject matter is not limited to illustrated examples and any means for performing the functionality described herein are included.

While the foregoing disclosure shows illustrative embodiments, it should be noted that various changes and modifications could be made herein without departing from the scope of the disclosed subject matter as defined by the appended claims. The functions, processes and/or actions of the method claims in accordance with the embodiments of the disclosed subject matter described herein need not be performed in any particular order. Furthermore, although elements of the disclosed subject matter may be described or claimed in the singular, the plural is contemplated unless limitation to the singular is explicitly stated.

What is claimed is:

1. A scheduler, comprising:
a picker block configured to grant an instruction for execution during an instruction cycle comprising a precharge phase and an evaluation phase; and
a validity block comprising a validity indicator configured to generate a valid signal which when set indicates that the instruction is valid, a valid instruction being an instruction that has been allocated to the scheduler but has not yet been dispatched for execution,
the picker block comprising a precharge switch configured to selectively precharge a grant of the instruction by
precharging one or more grant lines of the instruction during the precharge phase when the valid signal is set, and
refraining from precharging any of the one or more grant lines of the instruction during the precharge phase when the valid signal is not set,
wherein it is not required for an instruction to be ready for that instruction to be valid,
wherein an instruction is ready when all operands of that instruction are available, and
wherein the picker block is configured such that for each grant line of the instruction precharged during the precharge phase but not evaluated during the evaluation phase, that grant line is not discharged during the evaluation phase.

2. The scheduler of claim 1,
the validity indicator comprising a flip-flop configured to generate the valid signal as a single bit signal, and
the precharge switch comprising a transistor configured to be activated/deactivated based on the single bit valid signal.

3. The scheduler of claim 1, further comprising:
a wakeup block configured to generate a ready signal corresponding to the instruction, the ready signal when set indicates that the instruction is ready,
the validity block further comprising a valid & ready signal generator configured to generate a valid & ready signal based on the valid signal and the ready signal, the valid & ready signal when set indicates that the instruction is both valid and ready, and
the picker block further comprising one or more evaluation enable switches corresponding to the one or more grant lines, each evaluation enable switch being configured to
enable evaluation of the corresponding grant line during the evaluation phase when the valid & ready signal is set, and
disable evaluation of the corresponding grant line during the evaluation phase when the valid & ready signal is not set.

4. The scheduler of claim 3, the valid & ready signal generator comprising an AND logic configured to take as inputs the ready signal and the valid signal to generate the valid signal.

5. The scheduler of claim 3, the picker block comprising an inter-group picker configured to pick an oldest ready group and a newest ready group among a plurality of groups, each ready group having one or more ready instructions.

6. The scheduler of claim 5, the inter-group picker comprising:
a grant new line which when set after evaluation indicates that a group associated with the grant new line is the newest ready group;
a grant new evaluation circuit configured to perform a grant new evaluation to evaluate whether or not a group of the instruction is the newest ready group; and
a new evaluation enable switch configured to
enable the grant new evaluation circuit to perform the grant new evaluation during the evaluation phase when the valid & ready signal is set, and
disable the grant new evaluation circuit from performing the grant new evaluation during the evaluation phase when the valid & ready signal is not set.

7. The scheduler of claim 6, the new evaluation enable switch comprising a transistor configured to enable an electrical path between the grant new line and ground through the grant new evaluation circuit.

8. The scheduler of claim 6, the inter-group picker further comprising:
a grant old line which when set after evaluation indicates that a group associated with the grant old line is the oldest ready group;
a grant old evaluation circuit configured to perform a grant old evaluation to evaluate whether or not the group of the instruction is the oldest ready group; and
an old evaluation enable switch configured to
enable the grant old evaluation circuit to perform the grant old evaluation during the evaluation phase when the valid & ready signal is set, and
disable the grant old evaluation circuit from performing the grant old evaluation during the evaluation phase when the valid & ready signal is not set.

9. The scheduler of claim 8, the old evaluation enable switch comprising a transistor configured to enable an electrical path between the grant old line and ground through the grant old evaluation circuit.

10. The scheduler of claim 3,
the validity block further comprising:
an evaluation latch configured to latch a grant line signal from the picker block;
a valid & ready indicator configured to output the valid & ready signal from the valid & ready signal generator; and
a grant & ready indicator configured to generate a grant & ready signal based on the latched grant line signal from the evaluation latch and the valid & ready signal from the valid & ready indicator, the grant & ready signal when set indicates that the instruction has been granted, and
the wakeup block is further configured to wake up other instructions dependent on the granted instruction when the grant & ready signal is set.

11. The scheduler of claim 10,
the valid & ready indicator comprising a flip-flop configured to gate the output of the valid & ready signal generator, and
the grant & ready indicator comprising an AND gate configured to take as inputs the gated valid & ready signal from the valid & ready indicator and the latched grant line signal from the evaluation latch.

12. The scheduler of claim 1,
wherein a plurality of grant lines are associated with the instruction, wherein the picker block comprises a plurality of precharge switches corresponding to the plurality of grant lines, and wherein each precharge switch is configured to
selectively precharge a grant line corresponding to the precharge switch during the precharge phase when the valid signal is set, and
refrain from precharging the grant line corresponding to the precharge switch during the precharge phase when the valid signal is not set.

13. A method of scheduling instructions in a scheduler, the method comprising:
determining whether or not an instruction in the scheduler is valid, a valid instruction being an instruction that has been allocated to the scheduler but has not yet been dispatched for execution;
precharging one or more grant lines of the instruction during a precharge phase of an instruction cycle when it is determined that the instruction is valid, the instruction cycle comprising the precharge phase and an evaluation phase; and
refraining from precharging any of the one or more grant lines of the instruction during the precharge phase when it is determined that the instruction is not valid,
wherein it is not required for an instruction to be ready for that instruction to be valid,
wherein an instruction is ready when all operands of that instruction are available, and
wherein for each grant line of the instruction precharged during the precharge phase but not evaluated during the evaluation phase, that grant line is not discharged during the evaluation phase.

14. The method of claim 13, further comprising:
determining whether the instruction is ready when it is determined that the instruction is valid;
evaluating the instruction during the evaluation phase to determine whether or not the instruction should be granted when it is determined that the instruction is ready and valid.

15. The method of claim 14, precharging the one or more grant lines of the instruction and the evaluating the instruction occurring in a same instruction cycle.

16. The method of claim 14, repeating the evaluating the instruction in a next instruction cycle when it is determined that the instruction is not ready in a previous cycle.

17. The method of claim 13,
wherein a plurality of grant lines are associated with the instruction,
wherein precharging the one or more grant lines of the instruction comprises precharging the plurality of grant lines during the precharge phase when it is determined that the instruction is valid, and
wherein refraining from precharging comprises refraining from precharging any of the plurality of grant lines during the precharge phase when it is determined that the instruction is not valid.

18. A scheduler, comprising:
means for granting an instruction for execution during an instruction cycle comprising a precharge phase and an evaluation phase;
means for generating a valid signal which when set indicates that the instruction is valid, a valid instruction being an instruction that has been allocated to the scheduler but has not yet been dispatched for execution; and
means for selectively precharging a grant of the instruction configured to
precharge one or more grant lines of the instruction during the precharge phase when the valid signal is set, and
refrain from precharging any of the one or more grant lines of the instruction during the precharge phase when the valid signal is not set,
wherein it is not required for an instruction to be ready for that instruction to be valid,
wherein an instruction is ready when all operands of that instruction are available, and
wherein the scheduler is configured such that for each grant line of the instruction precharged during the precharge phase but not evaluated during the evaluation phase, that grant line is not discharged during the evaluation phase.

19. The scheduler of claim 18, further comprising:
means for generating a ready signal corresponding to the instruction, the ready signal when set indicates that the instruction is ready;
means for generating a valid & ready signal based on the valid signal and the ready signal, the valid & ready signal when set indicates that the instruction is both valid and ready; and
means for enabling evaluation corresponding to the one or more grant lines, each means for enabling evaluation configured to
enable evaluation of the corresponding grant line during the evaluation phase when the valid & ready signal is set, and
disable evaluation of the corresponding grant line during the evaluation phase when the valid & ready signal is not set.

20. The scheduler of claim 18, further comprising means for picking an oldest ready group and a newest ready group among a plurality of groups, each ready group having one or more ready instructions.

21. The scheduler of claim 20, the means for picking the oldest ready group and the newest ready group comprising:
a grant new line which when set after evaluation indicates that a group associated with the grant new line is the newest ready group;
a grant old line which when set after evaluation indicates that a group associated with the grant old line is the oldest ready group;
means for performing a grant new evaluation to evaluate whether or not a group of the instruction is the newest ready group;
means for performing a grant old evaluation to evaluate whether or not the group of the instruction is the oldest ready group;
means for enabling new evaluation configured to
enable the means for performing the grant new evaluation to perform the grant new evaluation during the evaluation phase when the valid & ready signal is set, and
disable the means for performing the grant new evaluation from performing the grant new evaluation during the evaluation phase when the valid & ready signal is not set; and
means for enabling old evaluation configured to
enable the means for performing the grant old evaluation to perform the grant old evaluation during the evaluation phase when the valid & ready signal is set, and disable the means for performing the grant old evaluation from performing the grant old evaluation during the evaluation phase when the valid & ready signal is not set.

22. The scheduler of claim 19, further comprising:

means for latching a grant line signal from the means for granting the instruction for execution;

means for outputting the valid & ready signal from the means for generating the valid & ready signal; and means for generating a grant & ready signal based on the latched grant line signal from the means for latching the grant line signal and the valid & ready signal from the means for outputting the valid & ready signal, the grant & ready signal when set indicates that the instruction has been granted, and means for waking up other instructions dependent on the granted instruction when the grant & ready signal is set.

23. The scheduler of claim 18, wherein a plurality of grant lines are associated with the instruction, and wherein the means for selectively precharging precharges the plurality of grant lines during the precharge phase when the valid signal is set, and refrains from precharging any of the plurality of grant lines during the precharge phase when the valid signal is not set.

\* \* \* \* \*